April 19, 1966  N. E. G. BACKMARK  3,247,421
TUNABLE MAGNETRON
Filed Nov. 14, 1962
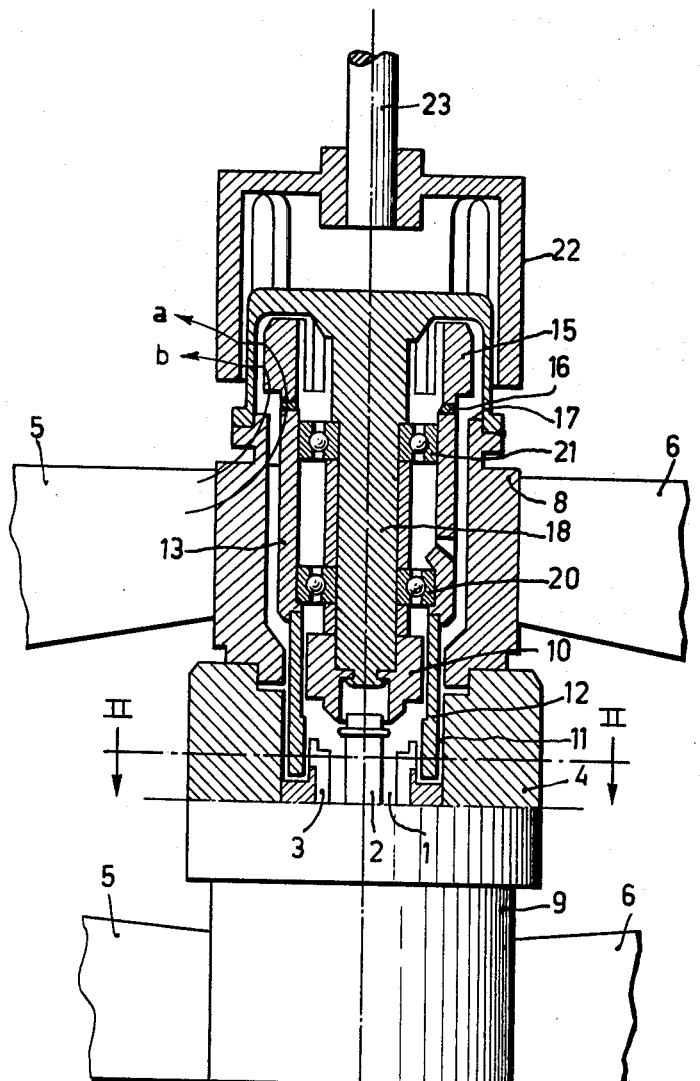
FIG. I
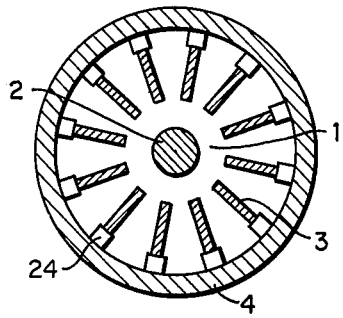
FIG. 2
INVENTOR.
NILS ERIK GUSTAF BACKMARK
BY
Frank R. Trifari
AGENT

United States Patent Office 3,247,421
Patented Apr. 19, 1966

3,247,421
TUNABLE MAGNETRON
Nils Erik Gustaf Backmark, Solna, Sweden, assignor to North American Philips Company, Inc., New York, N.Y., a corporation of Delaware
Filed Nov. 14, 1962, Ser. No. 237,646
Claims priority, application Sweden, Nov. 15, 1961, 11,365/61
5 Claims. (Cl. 315—39.61)

This invention relates to a magnetron having a tuning member rotatably arranged within the tube and the support of which is journalled within one of the attached pole-pieces, said tuning member being driven by means of internal and external armatures which are traversed by the stray field of the magnet system of the magnetron.

The bearings for the tuning member, which must have a very small friction in vacuo, can only be ball bearings, but the friction of such bearings depends to a considerable extent upon axial forces, especially if the bearings are of the radial type.

An object of the invention is to provide a novel structure in which the axial forces acting upon the bearings are limited as far as possible.

According to the invention, in a magnetron having a tuning member rotatably arranged within the tube and the support of which is journalled within one of the attached pole-pieces, which tuning element is driven by means of internal and external armatures traversed by the stray field of the magnet system of the magnetron, the support for the tuning member located within the pole-piece is made of soft magnetic material which is separated from the internal armature by a portion of high magnetic reluctance so that the axial forces acting upon the internal armature and upon the support balance one another.

Preferably, the whole of the support according to the invention is made of iron or mild steel so that the support has an output coefficient equal to that of the ball bearings and hence no difficulty occurs in the magnetron even at the high temperatures occurring.

According to the invention, the portion of high magnetic reluctance is located at the level of the outer edge of the pole-piece or a little farther outwards. The portion of high magnetic reluctance may consist of an intersoldered copper ring or simply by a local reduction of the cross-section of the body if the support and the internal armature are made in one piece. By the arrangement according to the invention, it is ensured that the axial forces acting on the tuning member and hence the friction in the bearings are limited as far as possible. In fact, if the support were made of non-magnetic material, the armature would be pulled inwards with too great a force. If the support were made of magnetic material adjoining the armature without reluctance, the support would be pulled outwards with too great a force. Any difference between the magnetic forces acting upon the internal armature and the support may further be corrected by means of an axial adjustment of the external armature, in which event it is also possible, dependent upon the position of the magnetron, to make allowance for gravity and, if desired, a certain extent of levitation is obtained.

The invention will now be described with reference to the accompanying drawing in which:

FIG. 1 shows a magnetron according to the invention partly in elevation and partly in section; and FIG. 2 is a sectional view along the line II—II of FIG. 1.

FIGS. 1 and 2 show the discharge space 1 of the magnetron with its cathode 2 and anode fins 3. The anode block is indicated by 4. Two C-shaped magnets 5 and 6 adjoin the attached pole-pieces 8 and 9 which also have internal pole-pieces the upper of which is indicated by 10. The natural frequency of the magnetron depends upon the position of a cylinder 12 having a shaped edge, which cylinder can rotate in the space 24 behind the anode fins to influence the properties of the resonant cavities as described in U.S. Patent 2,931,943. The tuning cylinder 12 is supported by an iron support 13 which is joined by an intersoldered copper ring 16 to a toothed internal armature 15. The copper ring 16 lies slightly beyond the outer edge 17 of the pole-piece 8. The assembly comprising the tuning cylinder, the support and the internal armature is supported by a column 18 of unmagnetic material of high magnetic reluctance by means of two radial ball bearings 20 and 21. Arranged outside the magnetron is an external armature 22 which has the same number of teeth as the internal armature 15. The shaft 23 of the external armature may be driven at a suitable speed.

FIG. 1 also shows two magnetic lines of force $a$ and $b$ which traverse and do not traverse respectively the support 13, but both of which pass through the internal armature 15. The lines of force $a$ produce an outwardly-directed force on the rotatable part and the lines of force $b$ an inwardly-directed force. The axial forces acting on the rotatable part may be compensated by a correct adjustment of the magnetic reluctance of the ring 16.

What is claimed is:

1. In an electron discharge device, in combination, an annular anode of electrically conductive material forming a substantially cylindrical space within the anode, a plurality of partition members of electrically conductive material extending inwardly into said cylindrical space, said partition members being spaced from one another and forming therebetween resonant cavities, said anode having recessed portions coaxial with the axis of the anode in a plane normal to said axis, a pair of pole-pieces for producing a magnetic field coaxial with the axis of said anode, a member rotatable in said recessed portions for varying the tuning of said device, and means to rotate said tuning member comprising a first armature traversed by a stray-field between said pole-pieces, means to rotatably support said first armature including a support member secured to one of said pole-pieces, a second armature external to said pole-piece and traversed by said stray-field for driving said first armature, and means coupling said first armature to said tuning member including a member of soft magnetic material which is separated from said first armature by a portion of high magnetic reluctance whereby the forces acting on said second armature and on the support member balance one another.

2. In an electron discharge device, in combination, an annular anode of electrically conductive material forming a substantially cylindrical space within the anode, a plurality of partition members of electrically conductive material extending inwardly into said cylindrical space, said partition members being spaced from one another and forming therebetween resonant cavities, said anode having recessed portions coaxial with the axis of the anode in a plane normal to said axis, a pair of pole-pieces for producing a magnetic field coaxial with the axis of said anode, a member rotatable in said recessed portions for varying the tuning of said device, and means to rotate said tuning member comprising a first armature traversed by a stray-field between said pole-pieces, means to rotatably support said first armature including a support member secured to one of said pole-pieces, a second armature external to said pole-piece and traversed by said stray-field for driving said first armature, and means coupling said tuning member to said first armature including a member of soft magnetic material which is separated from said first armature by a portion of high magnetic reluctance positioned at least adjacent an outer boundary surface of the pole-piece whereby the forces acting on said second armature and on the support member balance one another.

3. In an electron discharge device, in combination, an annular anode of electrically conductive material forming a substantially cylindrical space within the anode, a plurality of partition members of electrically conductive material extending inwardly into said cylindrical space, said partition members being spaced from one another and forming therebetween resonant cavities, said anode having recessed portions coaxial with the axis of the anode in a plane normal to said axis, a pair of pole-pieces for producing a magnetic field coaxial with the axis of said anode, a member rotatable in said recessed portions for varying the tuning of said device, and means to rotate said tuning member comprising a first armature traversed by a stray-field between said pole-pieces, means to rotatably support said first armature including a support member secured to one of said pole-pieces, a second armature external to said pole-piece and traversed by said stray-field for driving said first armature, and means coupling said tuning member to said first armature including a member of soft magnetic material which is separated from said first armature by a copper member constituting a portion of high magnetic reluctance whereby the forces acting on said second armature and on the support member balance one another.

4. In an electron discharge device, in combination, an annular anode of electrically conductive material forming a substantially cylindrical space within the anode, a plurality of partition members of electrically conductive material extending inwardly into said cylindrical space, said partition members being spaced from one another and forming therebetween resonant cavities, said anode having recessed portions coaxial with the axis of the anode in a plane normal to said axis, a pair of pole-pieces for producing a magnetic field coaxial with the axis of said anode, a member rotatable in said recessed portions for varying the tuning of said device, and means to rotate said tuning member comprising a first armature traversed by a stray-field between said pole-pieces, means to rotatably support said first armature including a support member secured to said pole-piece, a second armature external to said pole-piece and traversed by said stray-field for driving said first armature, and means coupling said tuning member to said first armature including a member of soft magnetic material which is separated from said first armature by a portion of reduced thickness constituting a portion of high magnetic reluctance whereby the forces acting on said second armature and on the support member balance one another.

5. In an electron discharge device, in combination, an annular anode of electrically conductive material forming a substantially cylindrical space within the anode, a plurality of partition members of electrically conductive material extending inwardly into said cylindrical space, said partition members being spaced from one another and forming therebetween resonant cavities, said anode having recessed portions coaxial with the axis of the anode in a plane normal to said axis, a pair of pole-pieces for producing a magnetic field coaxial with the axis of said anode, a member rotatable in said recessed portions for varying the tuning of said device, and means to rotate said tuning member comprising a first armature traversed by a stray-field between said pole-pieces, a support member secured to one of said pole-pieces, bearing means for rotatably supporting said first armature about said supporting member, a second armature external to said pole-piece and traversed by said stray-field for driving said first armature, and means for coupling said tuning member to said first armature including a member of soft magnetic material which is separated from said first armature by a portion of high magnetic reluctance whereby the force acting on said second armature and on the support member balance one another.

References Cited by the Examiner
UNITED STATES PATENTS

| | | | |
|---|---|---|---|
| 2,753,486 | 7/1956 | Phillips | 315—39.61 |
| 3,107,310 | 10/1963 | Carrier et al. | 310—103 |

DAVID J. GALVIN, *Examiner.*

GEORGE N. WESTBY, *Primary Examiner.*